(No Model.) 2 Sheets—Sheet 1.
A. T. WINCHELL.
WINDMILL.
No. 407,457. Patented July 23, 1889.
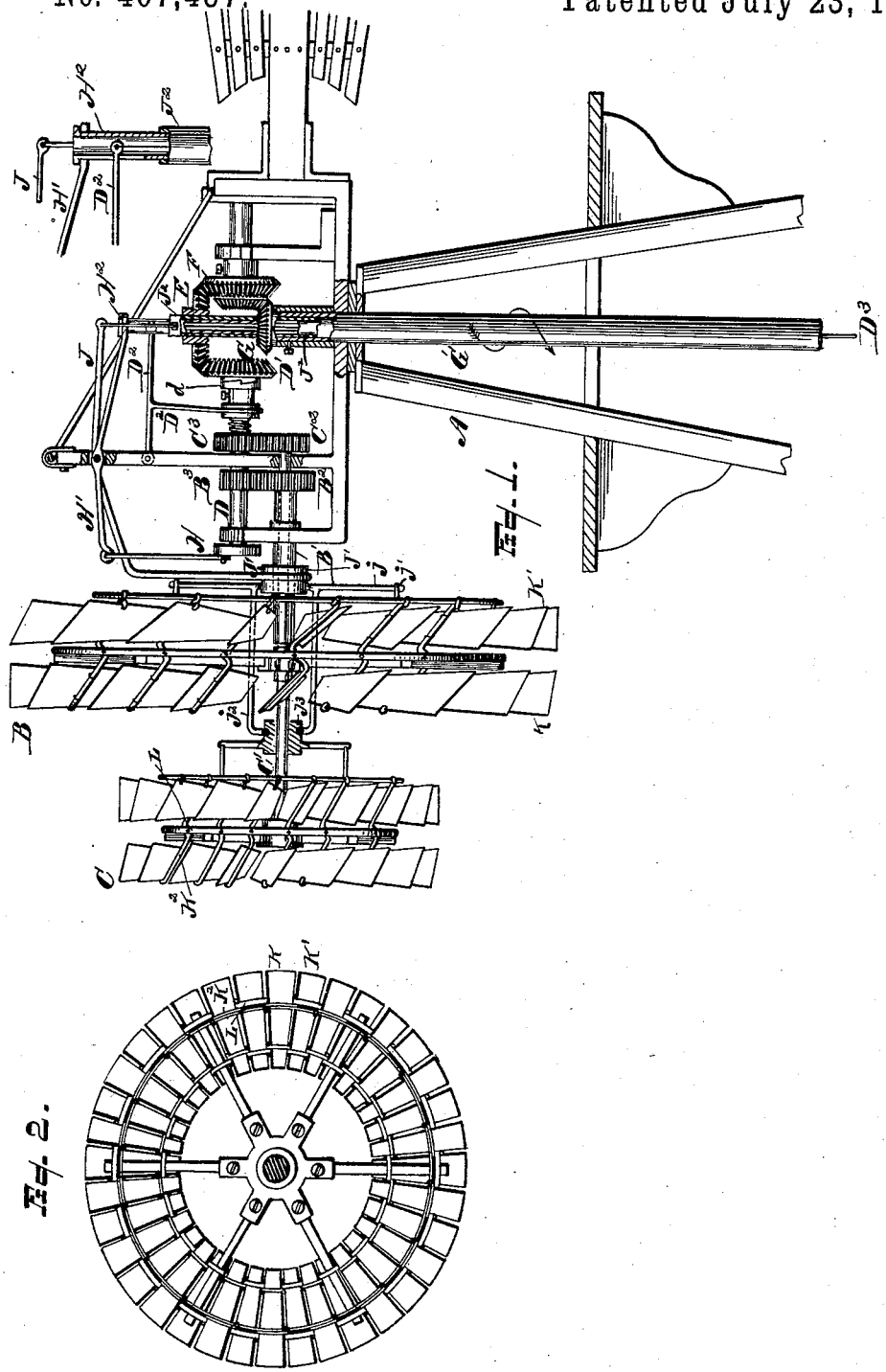
WITNESSES
Samuel E. Thomas
M. B. O'Dogherty
INVENTOR
Alvin T. Winchell
By W. W. Leggett,
Attorney (No Model.)  2 Sheets—Sheet 2.

A. T. WINCHELL.
WINDMILL.

No. 407,457. Patented July 23, 1889.

WITNESSES
Samuel E. Thomas
M. B. Dogherty

INVENTOR
Alvin T. Winchell
By Wells W. Leggett
Attorney

UNITED STATES PATENT OFFICE.

ALVIN T. WINCHELL, OF ALBION, MICHIGAN.

WINDMILL.

SPECIFICATION forming part of Letters Patent No. 407,457, dated July 23, 1889.

Application filed April 26, 1888. Serial No. 271,927. (No model.)

*To all whom it may concern:*

Be it known that I, ALVIN T. WINCHELL, a citizen of the United States, residing at Albion, county of Calhoun, State of Michigan, have invented a certain new and useful Improvement in Windmills; and I declare the following to be a full, clear, and exact description of the invention, such as will enable others skilled in the art to which it appertains to make and use the same, reference being had to the accompanying drawings, which form a part of this specification.

Figure 3:
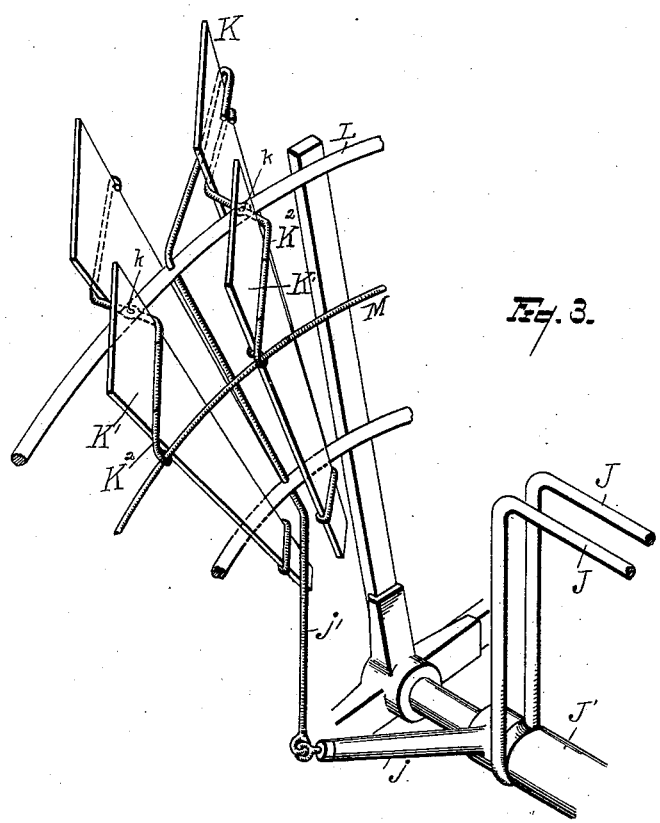
Figure 4:
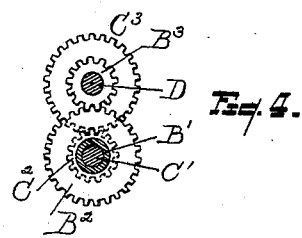

In the drawings, Figure 1 is a view, partly in section and partly in elevation, of a windmill mechanism embodying my invention. Fig. 2 is a front elevation of the said windmill. Fig. 3 represents how the vanes are clipped to their supporting-rings, so as to be divided fore and aft of the latter. Fig. 4 is a detail view of the gearing on the wind-wheel shaft.

My invention consists, essentially, in combining, in a windmill, wind-wheels of different diameters, each being connected with concentric shafts, and these shafts in turn geared to the drive-shaft by pinions, the said pinions being of a size which will permit the small wheel and larger wheel each to revolve at its normal speed, so that neither shall materially resist the rotation of the other, and so result in delivering to the drive-shaft a greater propelling-power than would be derived from a single wheel having the same wind-surface similarly disposed.

My invention consists in dividing the vanes fore and aft of their supporting-rings, each pair by a single clip; also in other novel features of construction.

In carrying out my invention, A represents the windmill-tower; B is its large wheel, C its small wheel. The shaft C' of the small wheel passes concentrically through the shaft B' of the large wheel, and pinions $B^2$ and $C^2$ are secured to their extremities and mesh, respectively, with pinions $B^3$ and $C^3$, which are fixed rigidly to the drive-shaft D. The pinion $B^2$ is larger than the pinion $C^2$, while the pinion $B^3$ is smaller than the pinion $C^3$. The relation between the pinions $B^2$ and $C^2$ is determined by the relative speed when in natural operation under the effects of the same breeze of the wind-wheels B and C, respectively, so that each wheel traveling with a normal velocity due to a common breeze will transmit its motion naturally to the same drive-shaft D without either one dragging or operating against the other, and in this way the said wheels are enabled to communicate to the drive-shaft a much greater propelling-power than would be the case were both wheels fixed rigidly to the same shaft and caused to operate as a single wheel.

The shaft D is provided with a loose bevel-pinion D' at its end, which may be thrown into or out of gear with the shaft by a clutch $d$, which is operated through the medium of the lever $D^2$ and the rod $D^3$, projecting therefrom down through the upright tubular standard within the tower. The object of the clutch $d$ is to allow the shaft D to rotate without rotating the drive-pinion D', so that it may be at rest while the pump continues to work. The pinion D' engages with the idle-gear E, and this in turn with a gear F upon the opposite side of the frame from the wheel. This gear F is made double, and one of its gears engages with the driven gear G at the top of the upright shaft G', which is thereby given a rotary motion, as indicated by the arrow. This communicates its motion in the usual way to any machinery to be driven. By thus making the gear F double I am enabled to make the driven gear G small enough to admit the drive-gear D', as indicated, beneath the idle-pinion E'. This economizes space and makes a compact construction. The gear F being opposite the driving-gear D' neutralizes the tendency known as "creeping," or the liability of the wind-wheel itself to turn about the vertical axis of the machine under the influence of a load.

H is a crank on the drive-shaft, which serves, through the walking-lever H', to operate the pump-rod $H^2$.

J is another walking-lever engaged with a sleeve J', and is operated by the hollow rod $J^2$, which projects down the tower to a point of convenient access, where it may be provided with any convenient means for lifting or depressing it. This lever is for the purpose of bringing the blades of the fans into or out of position to catch the wind. The sleeve J' has projecting arms $j$, which engage crank-arms $j'$, whereby the blades are operated. So, also, arms $j^2$ loosely engage the collar $j^3$, which simply serves to operate the blades of the smaller wind-wheel.

K and K' represent respectively the fore and aft sections of the blades of the wind-wheel. They are, as shown, attached to an angular arm $K^2$, which is pivoted at $k$ to the supporting-ring L of the wheel. The inner end of said angular arm is engaged with the connecting-rod M, which unites all of the said blades, so that any movement of one is communicated simultaneously to all said blades. This means of connecting the blades in pairs by a single connecting-arm $K^2$ is at once simple and effective.

What I claim is—

1. The combination, in a windmill, of wind-wheels of different diameters and concentric shafts, said wheels each independently geared with the drive-shaft by gear-wheels graded to conform to the normal speed of its wind-wheel, whereby each wheel driven at its normal speed, due to a given wind-pressure, is geared down to a common speed at the drive-shaft, substantially as and for the purposes described.

2. In a windmill, the combination, with its wheel and blade-supporting rings, of blades arranged in pairs, one blade forward and the other to the rear of the supporting-rings, each said pair engaged by the angular arm K, pivoted between the blades to said rings, substantially as and for the purposes described.

3. The combination of the fan-blades and their supporting-frame, said blades arranged in pairs, one blade in advance of and one in rear of their supporting-frame, said blades provided with the angular supporting-arms K, said arms engaged at their rear ends with a common rod M, whereby motion communicated to one blade is transmitted to all, substantially as and for the purposes described.

4. In a windmill, the combination, with the drive-shaft D, of gearing for imparting motion from said shaft to the machinery below, the crank H, eccentrically connected with said drive-shaft, and the walking-lever H', for operating a pump, the clutch $d$, and the pinion D', adapted to be thrown out of gear with the shaft by said clutch, whereby the pump may be operated while the gearing is at rest, substantially as described.

5. In a windmill, the combination, with wind-wheels of different diameters and concentric shafts, of sleeves J' J', provided with arms for adjusting the blades of said wind-wheels, the said sleeves connected by arms $j^2$, whereby the adjustment of the blades of said wheels is effected simultaneously, substantially as described.

In testimony whereof I sign this specification in the presence of two witnesses.

ALVIN T. WINCHELL.

Witnesses:
DAVID MONFORT,
ELVIRA MONFORT.